(12) United States Patent
Sapozhnykov et al.

(10) Patent No.: US 10,917,716 B2
(45) Date of Patent: Feb. 9, 2021

(54) APPARATUS FOR AND METHOD OF WIND DETECTION

(71) Applicant: Cirrus Logic International Semiconductor Ltd., Edinburgh (GB)

(72) Inventors: Vitaliy Sapozhnykov, Cheltenham (AU); Thomas I. Harvey, Northcote (AU); Hock Lim, Melbourne (AU); David Watts, Melbourne (AU)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 16/445,538

(22) Filed: Jun. 19, 2019

(65) Prior Publication Data

US 2020/0404415 A1    Dec. 24, 2020

(51) Int. Cl.
*H04R 3/00* (2006.01)
*G01P 15/18* (2013.01)
*H04R 1/10* (2006.01)
*H04R 1/22* (2006.01)

(52) U.S. Cl.
CPC .............. *H04R 3/002* (2013.01); *G01P 15/18* (2013.01); *H04R 1/1083* (2013.01); *H04R 1/222* (2013.01); *H04R 2410/07* (2013.01)

(58) Field of Classification Search
CPC .... H04R 1/1083; H04R 1/46; H04R 2460/09; H04R 2460/13; H04R 3/002; H04R 1/22; H04R 2410/07; G10L 21/0232; G10L 21/0208; G10K 11/17823; G10K 11/17854; G10K 2210/1081; G10K 2210/3026; G10K 2210/3027; G10K 2210/3028; G01P 15/18
See application file for complete search history.

(56) References Cited

U.S. PATENT DOCUMENTS

| | | | |
|---|---|---|---|
| 2014/0270231 A1* | 9/2014 | Dusan | H04R 1/46 381/74 |
| 2015/0245129 A1 | 8/2015 | Dusan et al. | |
| 2017/0361133 A1* | 12/2017 | Yu | A42B 1/006 |
| 2020/0020313 A1* | 1/2020 | Hua | H04R 1/1016 |

FOREIGN PATENT DOCUMENTS

CN    105259928 A    1/2016

OTHER PUBLICATIONS

International Search Report and Written Opinion of the International Searching Authority, International Application No. PCT/GB2020/051449, dated Aug. 31, 2020.
Rhudy, Matthew B. et al, Wind Field Velocity and Acceleration Estimation Using a Small UA, AIAA Modeling and Simulation Technologies Conference, Jun. 13, 2014, Reston, Vierginia.

* cited by examiner

*Primary Examiner* — Yogeshkumar Patel
(74) *Attorney, Agent, or Firm* — Jackson Walker L.L.P.

(57) ABSTRACT

A method, comprising: obtain one or more accelerometer signals derived from an accelerometer; and determining one or more parameters of wind at the accelerometer based on the one or more accelerometer signals.

19 Claims, 13 Drawing Sheets

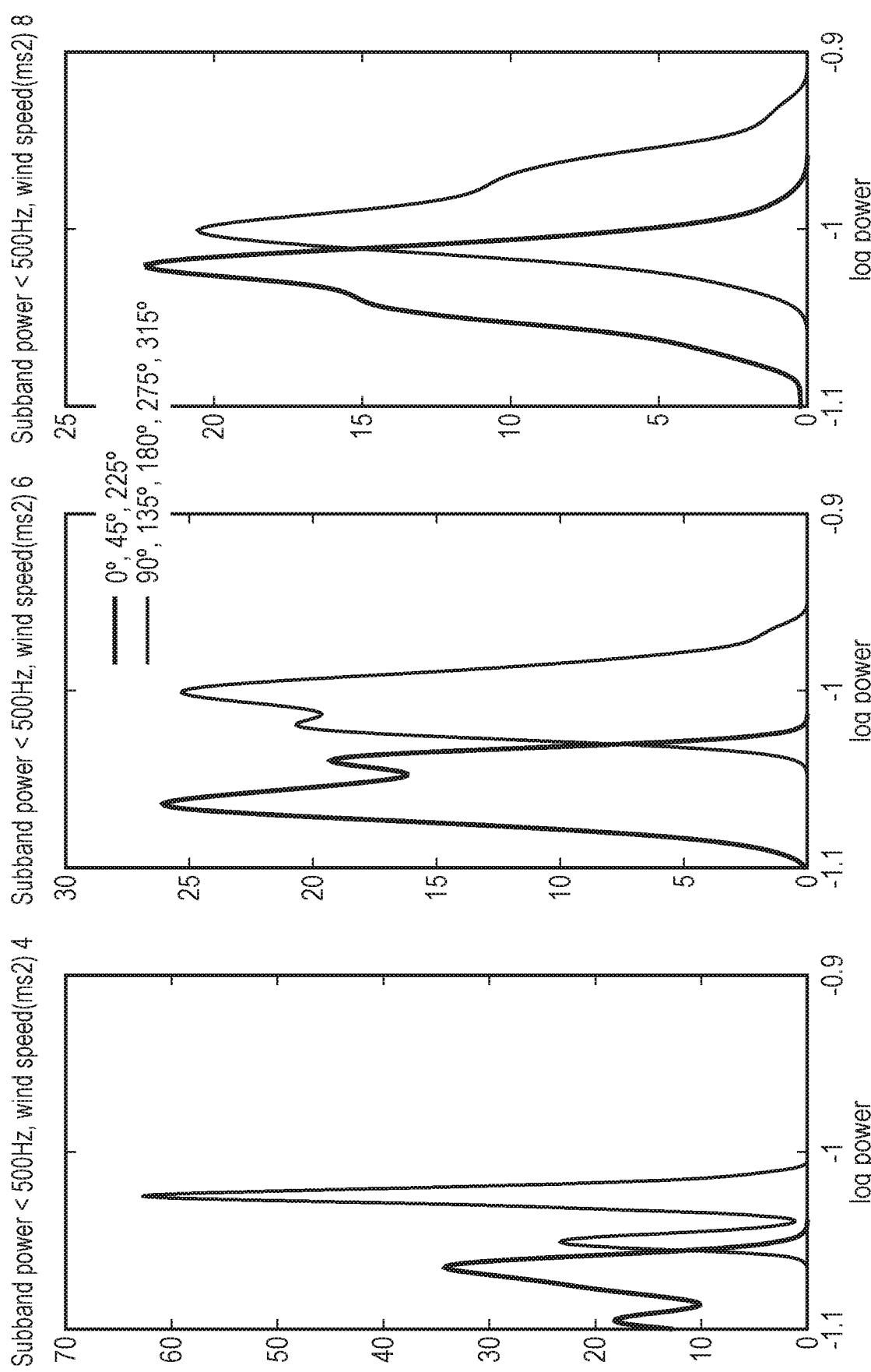

APPARATUS FOR AND METHOD OF WIND DETECTION

TECHNICAL FIELD

Embodiments of the disclosure relate to methods, apparatus and systems for detecting wind, estimating wind parameters and reducing wind noise in microphone signals, and particularly methods apparatus and systems for detecting and estimating wind and reducing wind noise using an accelerometer.

BACKGROUND

Wind noise in audio systems is generated from turbulence in an airstream flowing past a microphone port of over a microphone membrane. This is in contrast to non-wind noise (e.g. traffic, train, construction, etc.) which is generated due to sound pressure waves incident at a microphone membrane.

Wind noise can often have a large enough amplitude to mask more valuable sound in a microphone signal, such as voice. It is therefore desirable to suppress wind noise in microphone signals generated by such turbulence to enable non-wind noise components of the microphone signal to be heard and/or processed.

State of the art wind noise reduction algorithms require information concerning wind noise present in a microphone signal, commonly referred to as 'wind noise parameters', such as the probability of wind presence, wind velocity, wind direction, short- and long-term spectral amplitude, short- and long-term spectral cut-off frequency to name a few. However, since conventional microphones cannot distinguish between wind noise by itself and wind noise mixed with non-wind noise (e.g. traffic noise), it can be difficult to accurately determine wind noise parameters to be used by wind reduction algorithms.

In addition to the above, conventional microphones will often saturate in the presence of high wind resulting in clipping in microphone output signals. Very high winds (e.g. velocities greater than 12 ms$^{-1}$) can lead to total saturation of a microphone signal, meaning that no delineation can be made between the properties of winds having speeds above the velocity at which total saturation occurs.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Embodiments of the present disclosure seek to address or at least alleviate one or more of these problems by using an accelerometer or inertial measurement unit (IMU) to estimate the presence and characteristics of wind noise. The inventors have established that accelerometer signals can be used to delineate between turbulence generated due to a moving airstream and vibrations caused by incident sound pressure waves. This is because the force exerted by the movement of air (e.g. wind) around an accelerometer (or an enclosure in which the accelerometer is located) tends to exceed the threshold of sensitivity of the accelerometer, whereas the force exerted by even a very large sound pressure wave (e.g. greater than 100 dB SPL) is generally insufficient to exceed the threshold of sensitivity of the accelerometer.

Additionally, the effective mass of a typical MEMS microphone is orders of magnitude smaller than the proof mass of a MEMS accelerometer. Accordingly, whereas microphones become saturated in the presence of high velocity winds, accelerometers and IMUs are not saturated by high velocity winds. A typical MEMS accelerometer is designed with measurement ranges upwards of +/−16 g which exceeds the force exerted by volume air flows at significant wind speeds (e.g. upwards of 12 ms$^{-1}$).

Embodiments of the present disclosure utilise the above phenomena and characteristics of accelerometers and IMUs to detect wind noise and determine wind noise parameters irrespective of non-wind noise levels and in high wind conditions, for example speeds exceeding 12 ms$^{-1}$. Further, embodiments of the present disclosure aim to reduce wind noise in microphone signals based on wind noise parameters determined using signals from an accelerometer.

According to a first aspect of the disclosure, there is provided a method, comprising: receiving one or more accelerometer signals derived from an accelerometer; and determining one or more parameters of wind at the accelerometer based on the one or more accelerometer signals.

The one or more parameters of wind at the accelerometer may comprise a speed of wind at the accelerometer and/or an angle of incidence of wind at the accelerometer. The one or more accelerometer signals may comprise two or more accelerometer signals representing different axes of acceleration. In which case, determining the angle of incidence of wind at the accelerometer may comprise comparing the two or more accelerometer signals.

The one or more parameters of wind at the accelerometer may comprise an indication of the presence of wind at the accelerometer and/or a probability of the presence of wind at the accelerometer.

The method may further comprise filtering one or more of the one or more accelerometer signals to remove non-wind noise. The one or more parameters of wind may be determined based on the filtered one or more accelerometer signals. Filtering may comprise low pass filtering. Additionally or alternatively, high pass filtering may be applied to remove high frequency components of noise not associated with wind, such as movement.

The method may further comprise detecting the presence of non-wind noise in one or more of the one or more accelerometer signals. The determining may be performed only when non-wind noise is not detected.

The method may further comprise: receiving a microphone signal from a microphone proximate to the accelerometer; and reducing wind noise in the microphone signal based on the determined one or more parameters of wind at the accelerometer.

The determining of the one or more wind parameters at the accelerometer may comprise: determining a subband power in one or more of the accelerometer signals; and estimating a cut-off frequency of noise in the microphone signal based on the determined subband power in the one or more accelerometer signals. Wind noise may then be reduced in the microphone signal using the estimated cut-off frequency. For example, wind noise may be reduced in the microphone signal using a compressor, the knee point of the compressor being dynamically adjusted in dependence on the estimated cut-off frequency.

The determining of the one or more wind parameters at the accelerometer may further comprise determining wind speed. The knee point of the compressor may then be determined in dependence on the determined wind speed instead of or in addition to the estimated cut-off frequency.

Estimating the cut-off frequency may comprise translating the subband power into the cut-off frequency using a look up table.

The method may further comprise detecting the presence of wind at the microphone or determining a probability of wind at the microphone based on the microphone signal.

The step of determining one or more parameters of wind at the accelerometer may be performed in response to detecting the presence of wind at the microphone.

According to another aspect of the disclosure, there is provided an apparatus, comprising: memory; and a processor coupled to the memory and configured to: receive one or more accelerometer signals derived from an accelerometer; and determine one or more parameters of wind at the accelerometer based on the one or more accelerometer signals.

The one or more parameters of wind at the accelerometer may comprise a speed of wind at the accelerometer and/or an angle of incidence of wind at the accelerometer.

The one or more accelerometer signals may comprise two or more accelerometer signals representing different axes of acceleration. Determining the angle of incidence of wind at the accelerometer may comprise comparing the two or more accelerometer signals.

The one or more parameters of wind at the accelerometer may comprise an indication of the presence of wind at the accelerometer and/or a probability of the presence of wind at the accelerometer.

The processor may be further configured to: filter one or more of the one or more accelerometer signals to remove non-wind noise. The one or more parameters of wind may be determined based on the filtered one or more accelerometer signals.

The processor may be further configured to: detect the presence of non-wind noise in one or more of the one or more accelerometer signals. The determining may be performed only when non-wind noise is not detected.

The processor may be further configured to: receive a microphone signal derived from a microphone proximate to the accelerometer; and reduce wind noise in the microphone signal based on the determined one or more parameters of wind at the accelerometer.

Determining one or more wind parameters at the accelerometer may comprise: determining a subband power in one or more of the accelerometer signals; and estimating a cut-off frequency of noise in the microphone signal based on the determined subband power in the one or more accelerometer signals. Wind noise may then be reduced in the microphone signal using the estimated cut-off frequency. For example, the processor may be configured to implement a compressor to reduce wind noise in the microphone signal and the knee point of the compressor may be determined in dependence on the estimated cut-off frequency. In some embodiments, determining one or more wind parameters at the accelerometer may further comprise determining wind speed. In which case, the knee point of the compressor may be determined in dependence on the determined wind speed, in addition or instead of using the estimated cut-off frequency.

Estimating the cut-off frequency may comprise translating the subband power into the cut-off frequency using a look up table stored in the memory.

The processor may be further configured to: detect the presence of wind at the microphone or determine a probability of wind at the microphone based on the microphone signal. The step of determining one or more parameters of wind at the accelerometer may be performed in response to detecting the presence of wind at the microphone.

The apparatus may further comprise the microphone. The apparatus may further comprise the accelerometer.

According to another aspect of the disclosure, there is provided an electronic device comprising the apparatus as described above.

According to another aspect of the disclosure, there is provided a non-transitory machine-readable medium storing instructions which, when executed by processing circuitry, cause an electronic apparatus to: receive one or more accelerometer signals derived from an accelerometer; and determine one or more parameters of wind at the accelerometer based on the one or more accelerometer signals.

According to another aspect of the disclosure, there is provided a method of reducing wind noise in a microphone signal received from a microphone, the method comprising: receiving one or more accelerometer signals from one or more accelerometers in proximity to the microphone; determining a subband power in one or more of the one or more accelerometer signals; estimating a cut-off frequency of noise in the microphone signal based on the determined subband power; and reducing wind noise in the microphone signal using the estimated cut-off frequency.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the present disclosure will now be described by way of non-limiting example only with reference to the accompanying drawings, in which:

FIGS. 5a, 5b and 5c are density plots representing power density measured by the accelerometer of the apparatus shown in FIGS. 1a to 1c in the presence of wind having speeds of 4 m/s, 6 m/s and 8 m/s respectively;

DESCRIPTION OF EMBODIMENTS

Embodiments of the present disclosure relate to the acquisition and use of accelerometer signals for detecting wind noise, delineating between wind noise and non-wind noise, determining characteristics of wind over a wide range of wind conditions, and reducing wind noise in microphone signals.

MEMS microphone and accelerometer devices can both be modelled as simple harmonic oscillators (mass-spring systems). However, the design of these devices is optimised for different problems; one for measuring acceleration, and the other for measuring sound pressure. Accordingly, the effective mass of the MEMS microphone membrane is orders of magnitude smaller than the proof mass of an accelerometer MEMS. The relatively small effective mass of a MEMS microphone membrane makes it a poor transducer of spatial signals. It also makes MEMS microphones more susceptible to wind noise, this problem being exacerbated in MEMS microphones by their construction, in particular their port dimensions. The size of the port is a trade-off between minimising ingress of impurities and limiting turbulent convective pressures. In general, the flow of air around the port of the microphone creates three noise sources; upstream turbulence, trailing edge vortex shedding, and boundary layer turbulence. The level and spectrum of these noise sources depends on incident wind speed, relative microphone orientation and the presence and characteristics of physical barriers, such as wind screening.

The inventors have realised that, in contrast to MEMS microphones, MEMS accelerometers can be used to delineate between turbulence generated due to a moving airstream and vibrations caused by incident sound pressure waves. This is because the typical force exerted by the movement of air (e.g. wind) tends to exceed the threshold of sensitivity of a typical MEMS accelerometer, whereas the typical force exerted by even a very large sound pressure wave (e.g. greater than 100 dB SPL) tends to be insufficient to exceed the threshold of sensitivity of the accelerometer. Embodiments of the present disclosure apply the above phenomenon to various aspects of microphone sound processing, such as wind noise reduction and suppression in microphone signals.

Figure 1A:
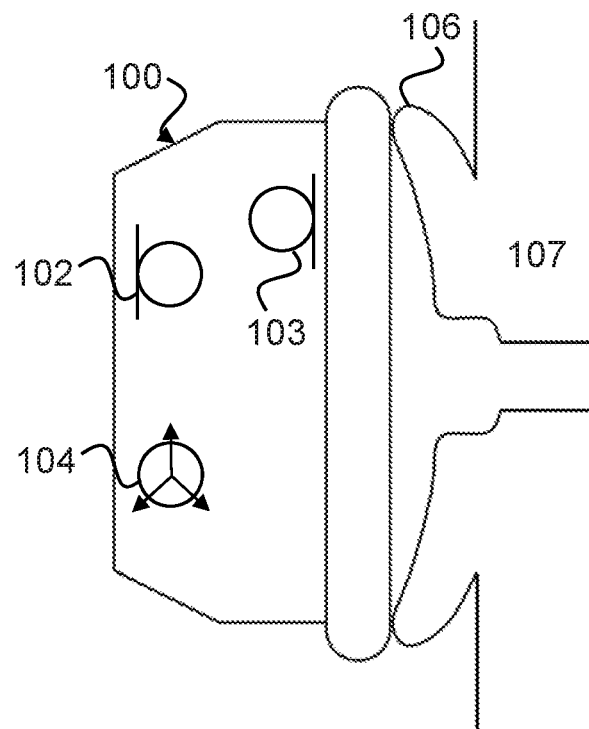
FIGS. 1a and 1b are schematic diagrams of an apparatus according to an embodiment of the present disclosure.

FIG. 1a is a schematic diagram of an apparatus 100 according to an embodiment of the disclosure comprising an external microphone 102, an internal microphone 103, and an accelerometer 104. In some embodiments, the external and internal microphones 102, 103 are MEMS microphones. The external and internal microphones 102, 103 may be respective reference and error microphones and may be used for noise cancellation using techniques well known in the art. In some embodiments, the accelerometer 104 is a MEMS accelerometer. In some embodiments, the accelerometer 104 may be configured to measure movement in one or more dimensions. For example, the accelerometer 104 may generate output signals representative of acceleration in a plurality of spatial dimensions in three-dimensional space (x and y, or x and y and z, or y and z). Whilst in the following description, the accelerometer 104 will be described as being configured to generate three output signals representative of x, y and z spatial axes, it will be appreciated that embodiments of the present disclosure are not limited to accelerometers having three axes. Whilst the apparatus 100 is shown with both an internal microphone 102 and an internal microphone 103, it will be appreciated that embodiments are not limited to the exemplified provision and placement of microphones in FIG. 1a. For example, in alternative embodiments the apparatus may comprise one microphone or more than two microphones, which may be positioned anywhere on or in the apparatus 100.

In the embodiment shown in FIG. 1a, the apparatus 100 is a headphone configured for placement on an ear 106 of a user 107. It will be appreciated, however, that techniques described herein may be implemented on any apparatus comprising a microphone and an accelerometer. Such apparatus may include but are not limited to an earphone, headphone, headset, earbud, earphone, ear defender, smartphone, tablet, or other apparatus for delivering sound to and/or cancelling sound at the eardrum (actively or passively). Any such apparatus may be placed over or on the ear or in the ear canal.

Figure 1B:
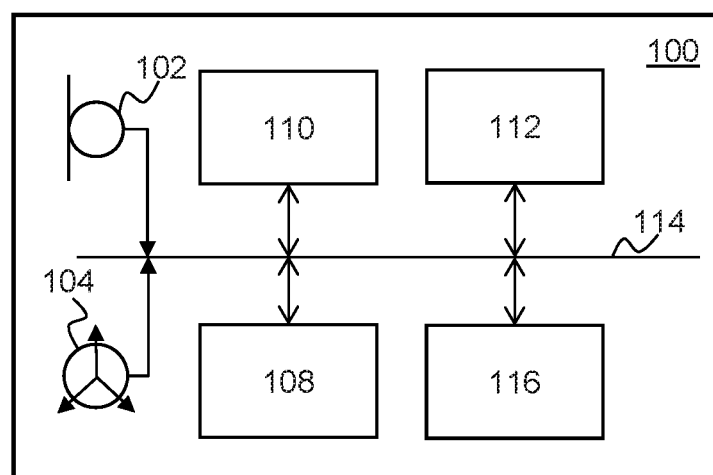

FIG. 1b is a schematic diagram of the apparatus 100 in an exemplary configuration. The apparatus 100 comprises a processor 108, a memory 110, and a transceiver 112. The processor 108 may be provided as a single component or as multiple components. Equally, the memory 110 may be provided as a single component or as multiple components. Data may be transmitted between elements of the apparatus 100 via a bus 114 or the like in any manner known in the art. The processor 108 may be a digital signal processor (DSP) or an applications processor of the apparatus 100. The processor 108 may be configured to receive and process signals received from the microphone 102 and the accelerometer 104. The processor 108 may be configured to perform operations on signals received from the microphone 102 and/or accelerometer 104. The apparatus 100 may further comprise additional processing circuitry 116 for performing interim processing of signals received from the microphone 102 and/or the accelerometer 104. For example, the processing circuitry may comprise one or more analog-to-digital converters (ADCs), one or more digital-to-analog converters (DACs), and/or one or more FFT modules. For simplicity, only one microphone 102 is shown in FIG. 1b. The internal microphone 103 shown in FIG. 1a may also be in communication with the bus 114 or the like. The memory 110 may be provided for storing data and/or program instructions. The transceiver 112 may be configured to enable communication (wired or wireless) with external devices, such as a smartphone, a computer, or the like. In some embodiments, the transceiver may be configured to establishing a Bluetooth connection. It will be appreciated that the apparatus 100 may comprise additional components which are not shown in FIGS. 1a and 1b, such as a speaker, additional microphones etc.

Figure 1C:
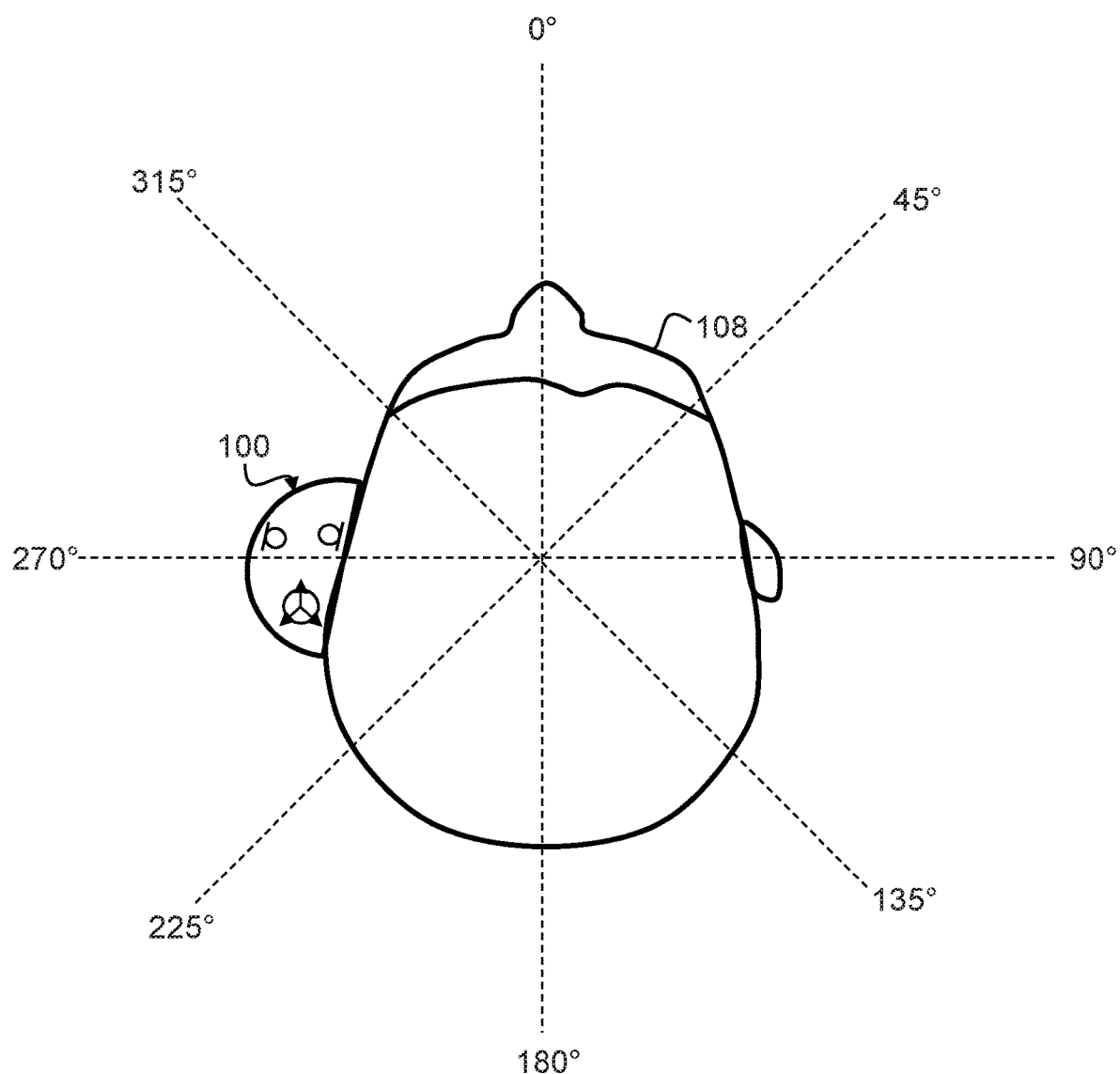
FIG. 1c is a plan view showing the apparatus of FIGS. 1a and 1b positioned on the ear of a user.

FIG. 1c is an aerial view of the apparatus 100 positioned on the ear 106 of the user 107, in this case, the ear 106 is the left ear of the user 107. Throughout the following description of the apparatus 100, the angle of incidence of wind on the device will be described in degrees. FIG. 1c illustrates the reference frame of these angles, 0° representing wind incident at the front of the user's face, 90° representing wind incident at the right side of the user's head and travelling toward the right ear, 180° representing wind incident at the back of the user's head, and 270° representing wind incident at the left side of the user's head and travelling toward the left ear 106. As will be described in more detail below, it will be appreciated that depending on the angle of incidence of wind at the apparatus, the amount of wind noise picked up by the microphones 102, 103 and/or the accelerometer 104 may be affected by turbulence around the head, the ear 106 and the apparatus 100 itself, as well as shadowing of the microphones 102, 103 and/or the accelerometer 104 by the body of the apparatus 100 and the user 107. This will become more apparent in the following discussions regarding signal power received at the accelerometer 104 at various angles of incidence of wind.

Figure 2:
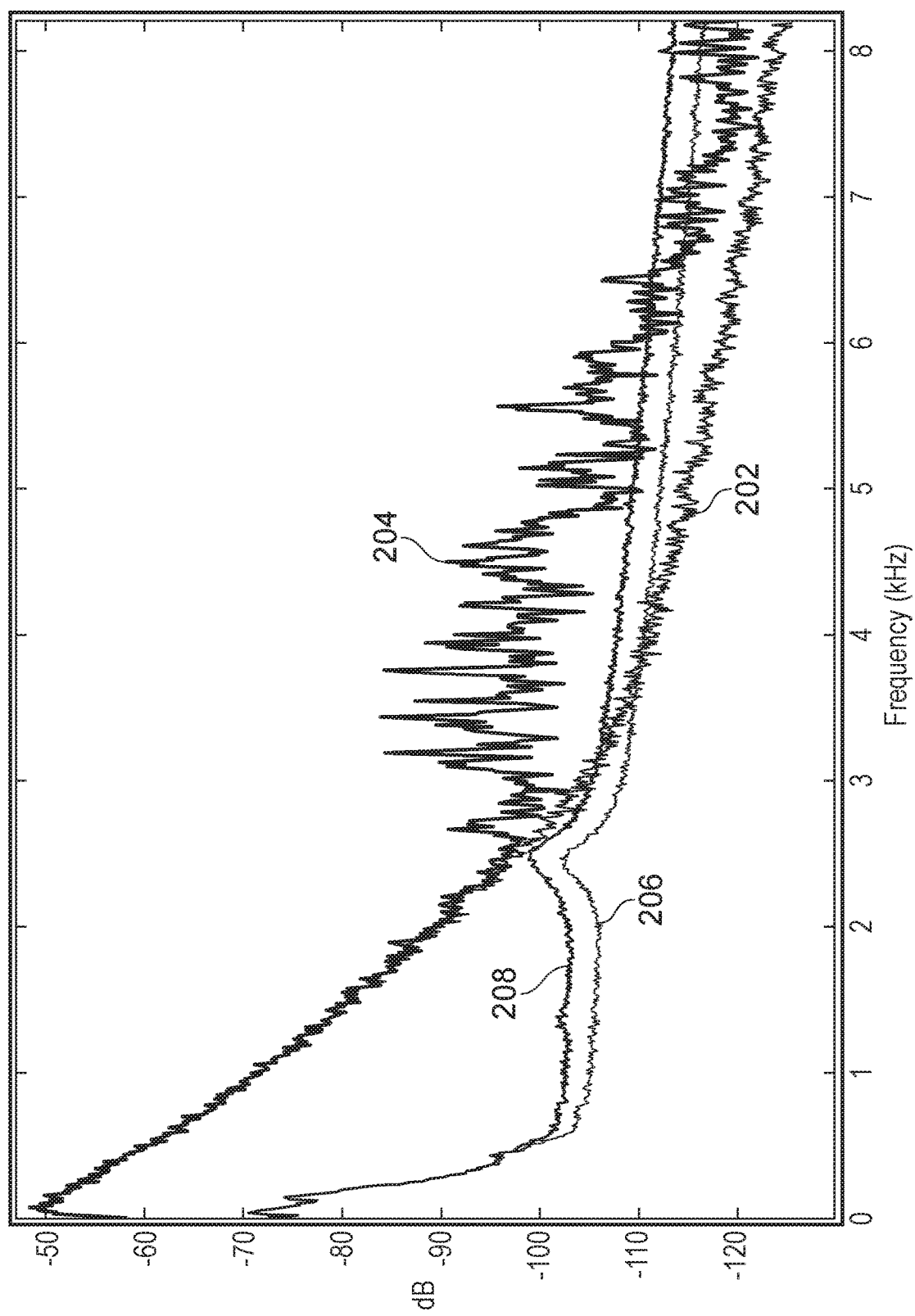
FIG. 2 is a graph of frequency vs power for a microphone and an accelerometer of the apparatus shown in FIGS. 1a to 1c for various noise conditions.

FIG. 2 is a graph of frequency vs power for the microphone 102 and the accelerometer 104 for various noise conditions. Line 202 represents a power spectra of an output signal of the microphone 102 in in the presence of wind noise only. Line 204 represents a power spectra of an output signal of the microphone 102 in in the presence of wind noise and non-wind noise (train noise). Line 206 represents a power spectra of an output signal of the accelerometer 104 in the presence of wind noise only. Line 208 represents a power spectra of an output signal of the accelerometer 104 in the presence of wind noise and non-wind noise (train noise).

It can be seen that the power spectra 202, 204 of the output signals from the microphone 102 with and without wind noise are very similar for frequencies below around 2.5 kHz. However, there is a considerable difference in the power spectra of the output signal from the microphone 102 in the presence of non-wind noise, particularly above 2.5 kHz. For some frequencies the dB power difference is over 25 dB. In contrast, the power spectra 206, 208 of the output signal from the accelerometer 104 with and without wind noise differs at most by 5 dB and any difference is substantially frequency independent at frequencies above 500 Hz. Below 500 Hz there is no difference between the power spectra 206, 208 with or without wind noise. Thus it can be seen that the output signal of the accelerometer 104 is substantially unaffected by non-wind noise.

Figure 3A:
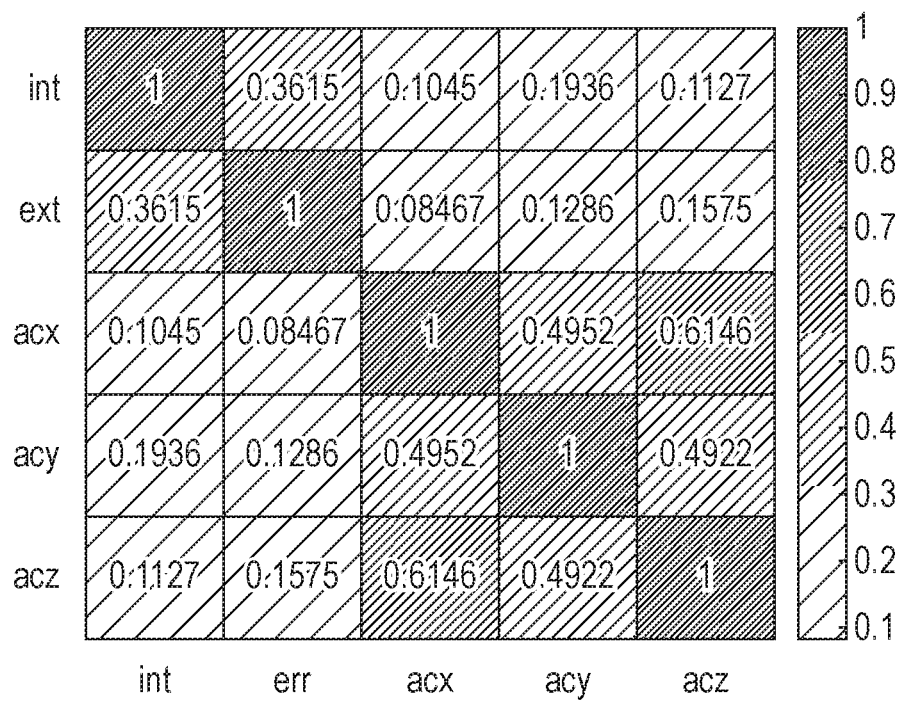
FIGS. 3a and 3b are power correlation matrices for an output signal of internal and external microphones and outputs of three spatial axis of the accelerometer of the apparatus shown in FIGS. 1a to 1c.
Figure 3B:
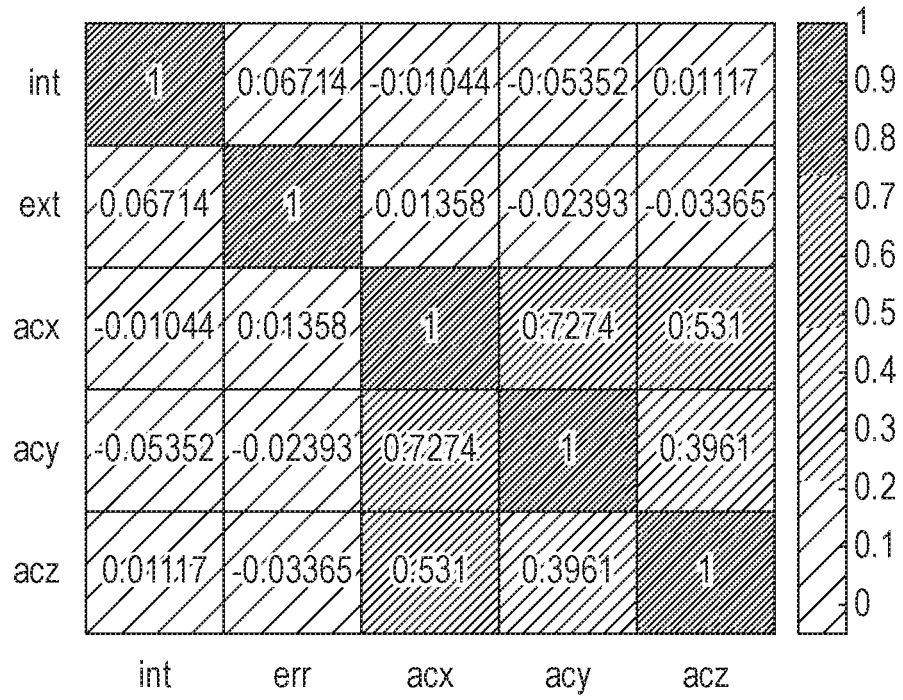

FIGS. 3a and 3b are power correlation matrices for an output signal of the internal and external microphones 102, 103 and output signals for three spatial axes of the accelerometer 104 ("x", "y" and "z") in the presence of speech (FIG. 3a) and wind at 4 ms$^{-1}$ (FIG. 3b) respectively. It can be seen that no statistically significant correlation exists between the acoustic domain as recorded by the microphone 102 and the spatial domain as recorded by the accelerometer 104 in any spatial dimension in the presence of either speech or wind. In the presence of wind in particular, there appears to be no correlation whatsoever between signals generated by the microphone 102 and those generated by the accelerometer 104. In contrast, it can be seen that some correlation exists between each of the x, y and z axis output signals from the accelerometer 104.

In the presence of wind, there is also very little correlation between internal and external microphone signals. It is believed this is due to turbulence existing around ports of the microphones 102, 103 due to vortices which form at the port openings associated with each microphone 102, 103. These vortices increase with increasing wind speed and with decreasing port size/diameter. So as wind speed increases, microphone signals begin to saturate due to the turbulent flow around the port opening. This saturation can be mitigated to some extent by increasing the size of the port; for larger ports, less shedding occurs which in turn averages the vortices. There is, however, a limit to the size that ports can be made in practice due to potential contamination and/or ingress at the port entrance.

Generally, the saturation in MEMS microphones begins to occur at wind speeds of around 2-3 m/s. MEMs microphones typically have a sound pressure level (SPL) limit of between 120 dB to 130 dB SPL for speech. The crest factor of wind noise is lower than the crest factor of speech, so the SPL limit of MEMs microphones for wind is between 110-120 dB SPL. MEMs microphones also have a high pass response with a 3 dB cut-off of between 35-85 Hz.

Conventionally, wind parameters are estimated based on signals received from one or both of the microphones 102, 103. The spectral power of wind noise in a microphone signal is approximately inversely proportional to its frequency below a cut-off frequency at which this relationship breaks down. In other words, wind noise follows a 1/f profile in the spectral domain. Accordingly, an existing approach to estimating wind noise involves determining the subband power spectrum of a microphone signal using, for example, Fourier analysis and subsequently determining the cut-off frequency, i.e. the frequency at which the spectral power of noise in the microphone flattens out. This determined cut-off frequency may then be used, for example, to vary compression bandwidth and knee point of subsequent suppression steps so that such suppression does not excessively remove low frequency components from the noise-affected microphone signal.

The problem with this approach is that microphone signals often contains non-linear components of noise in the form of turbulence and noise sources other than wind e.g. car noise, own voice etc. This type of non-linear noise can make it difficult to determine the cut-off frequency of the wind portion of noise present in the microphone signal.

Embodiments of the present disclosure utilise the accelerometer 104's insensitivity to non-wind noise sources to determine wind parameters, particularly in the environments in which both wind noise and non-wind noise is present. These determined parameters may in turn be used for wind noise reduction/suppression of audio signals received at one or both of the microphones 102, 103. Several useful parameters can be derived from signals generated by the accelerometer 104. For example, a linear estimate of wind power, speed and angle of wind incidence may be determined. Such parameters may be used to estimate the cut-off frequency of wind noise at the microphone 102 which may in turn be used for wind noise reduction. Additionally, a reliable estimate of own voice in the form of subband power estimation may be determined from signals from the accelerometer 104. An estimate of own voice derived from accelerometer signals may be used to determine periods in which the linear estimate of wind speed and angle will be accurate, since the presence of own-voice at the apparatus 100 may affect the relationship between accelerometer signal power and each of wind speed and wind angle of incidence. Similarly, non-wind noise associated with movement of the accelerometer 104 may be estimated from signals output from the accelerometer which may be used to determined periods of accurate wind parameter estimation.

Figure 4A:
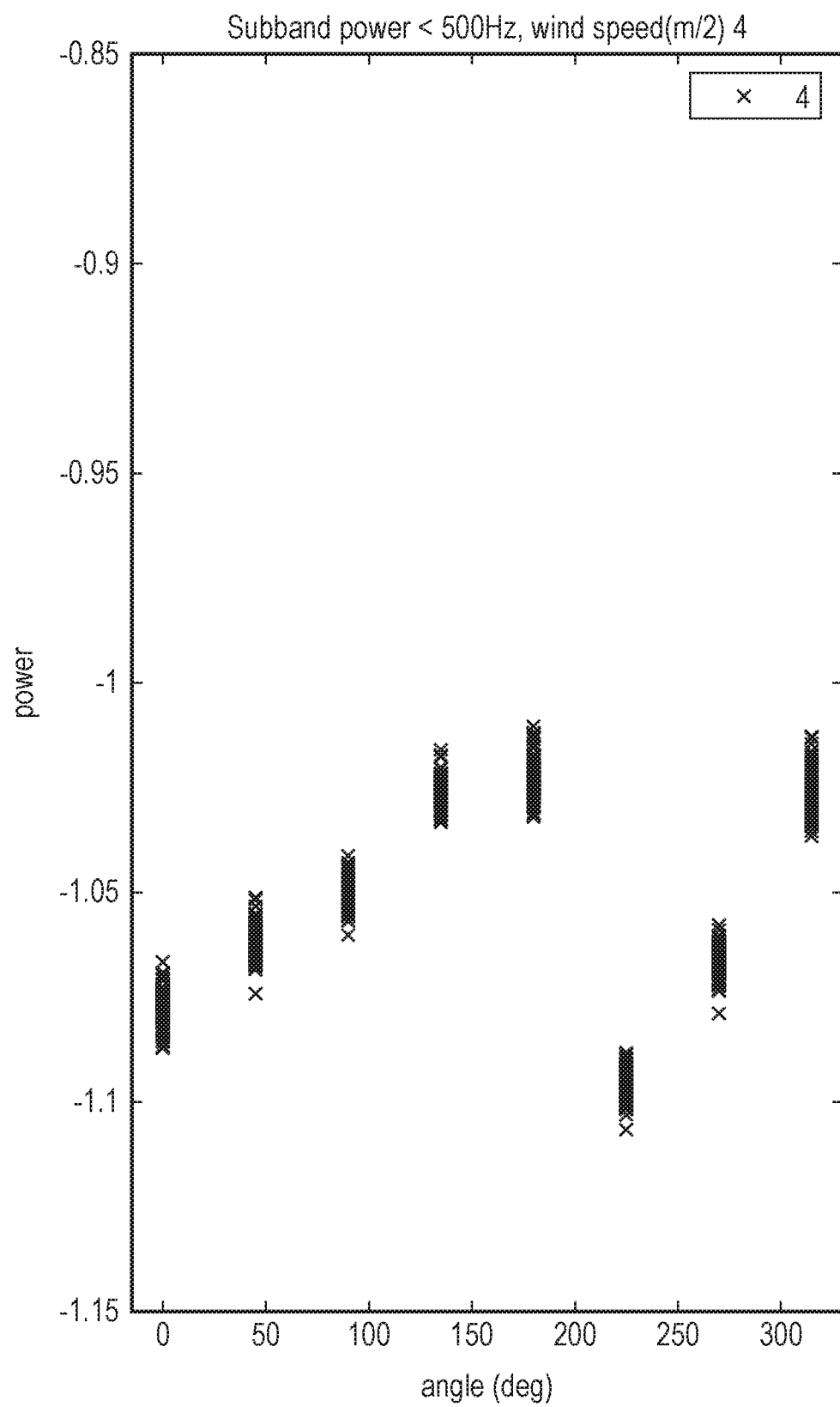
FIGS. 4a, 4b and 4c are scatter plots of angle of incidence of wind versus accelerometer subband signal power below 500 Hz for wind having speeds of 4 m/s, 6 m/s and 8 m/s respectively incident at the accelerometer of the apparatus shown in FIGS. 1a to 1c.
Figure 4B:
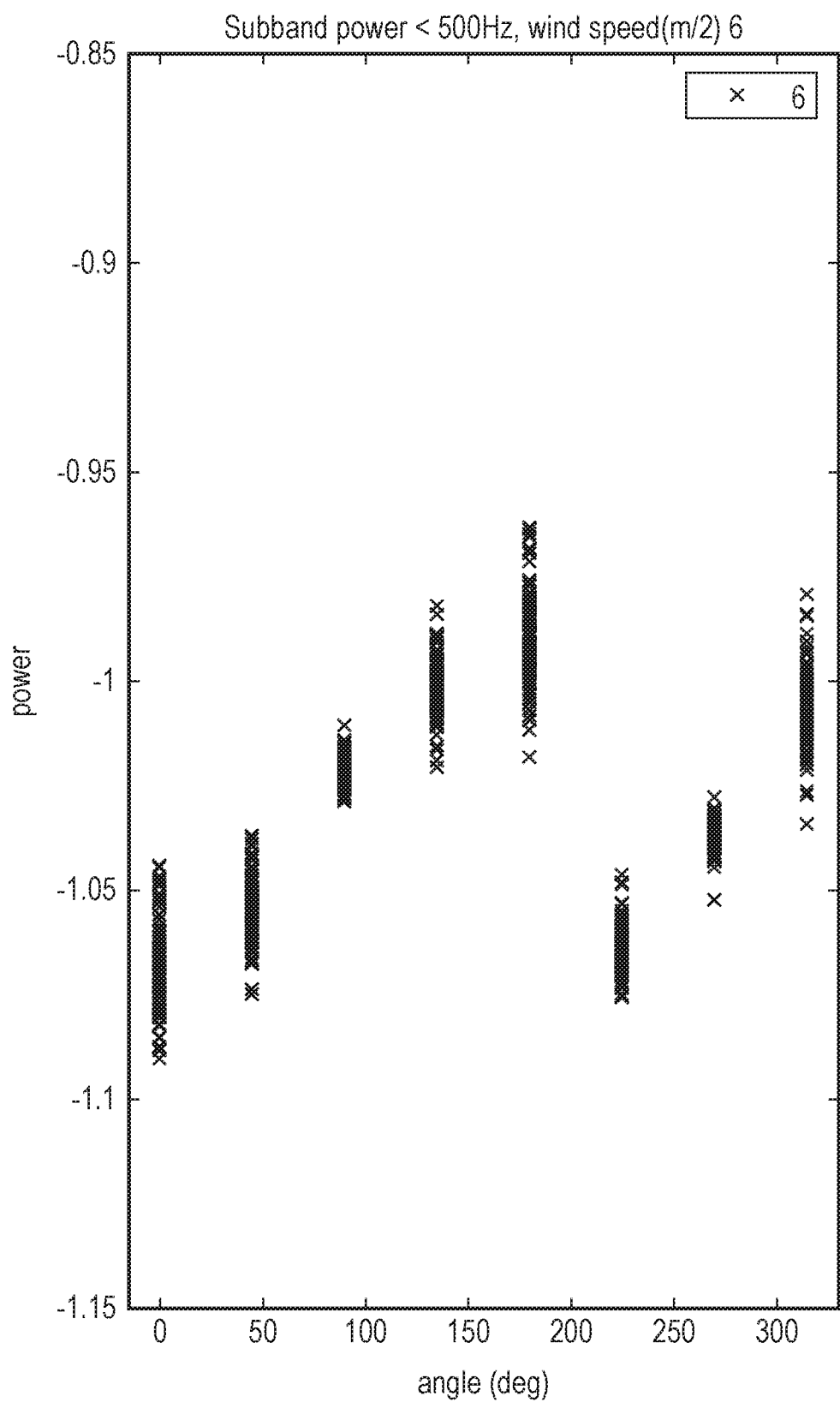
Figure 4C:
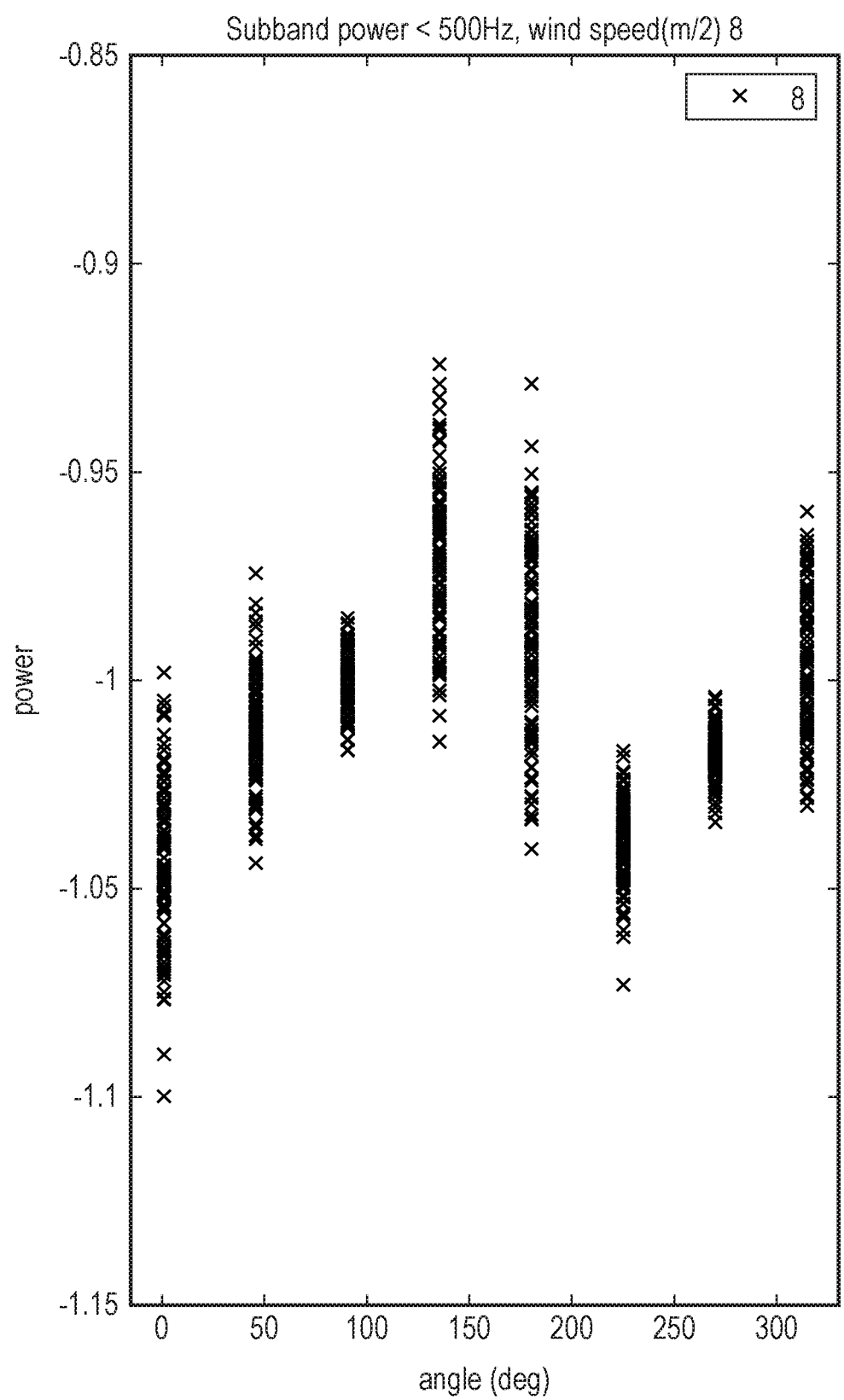

FIGS. 4a, 4b and 4c are scatter plots of angle of incidence of wind (x axis) versus accelerometer subband signal power below 500 Hz (y axis) for wind having speeds of 4 m/s, 6 m/s and 8 m/s respectively incident at the accelerometer 104. It can be seen from FIGS. 4a, 4b and 4c that accelerometer subband power is dependent on wind speed. At all angles of incidence of wind, the higher the wind speed, the higher the subband power in the accelerometer signal. It can also be seen that accelerometer subband power is dependent on incident wind angle, irrespective of wind speed. It can be seen therefore that accelerometer subband power may be used to estimate the angle of incidence of wind relative to the accelerometer 104. It can also be seen from these figures, as mentioned above with reference to FIG. 1c, that turbulence and/or shadowing proximate to the accelerometer 104 may lead to a reduction in accelerometer subband power measured by the accelerometer 104 in the presence of wind incident at angles of 0°, 45°, and 225° through 315° relative to the head of the user 107 (as shown in FIG. 1c). Thus, there is a significant drop in subband power measured at the accelerometer 104 between 180° and 225° degrees which then increases through 275° and 315° incident wind angle.

FIGS. 4a, 4b and 4c depict data for a single axis of the accelerometer 104 with the apparatus 100 positioned on the left ear 106 of the user 107 as shown in FIG. 1c. Using a single axis of the accelerometer 104 limits the angular resolution to two classes defined by a grouping of angles. This is illustrated by FIGS. 5a, 5b and 5c which each show two density curves representing power measured by the accelerometer 104 in the presence of wind incident at 225°, 275° and 315° (left hand curves) and at 0°, 45°, 90°, 135° and 180° (right hand curves). FIGS. 5a, 5b and 5c show power density plots for wind at speeds of 4 m/s, 6 m/s and 8 m/s respectively. It can be seen again from these Figures that shadowing from the user 107 results in a reduction in measured signal power at the accelerometer 104.

It will be appreciated that by using additional axes of the accelerometer 104, the measured subband power of each additional axis may be used to increase the angular resolution of the estimate of wind angle by the accelerometer 104. For example, using a second axis of the accelerometer 104, any ambiguity as to the incidence angle of wind in one axis of the accelerometer 104 may be resolved using the signal from the second axis.

Figure 6A:
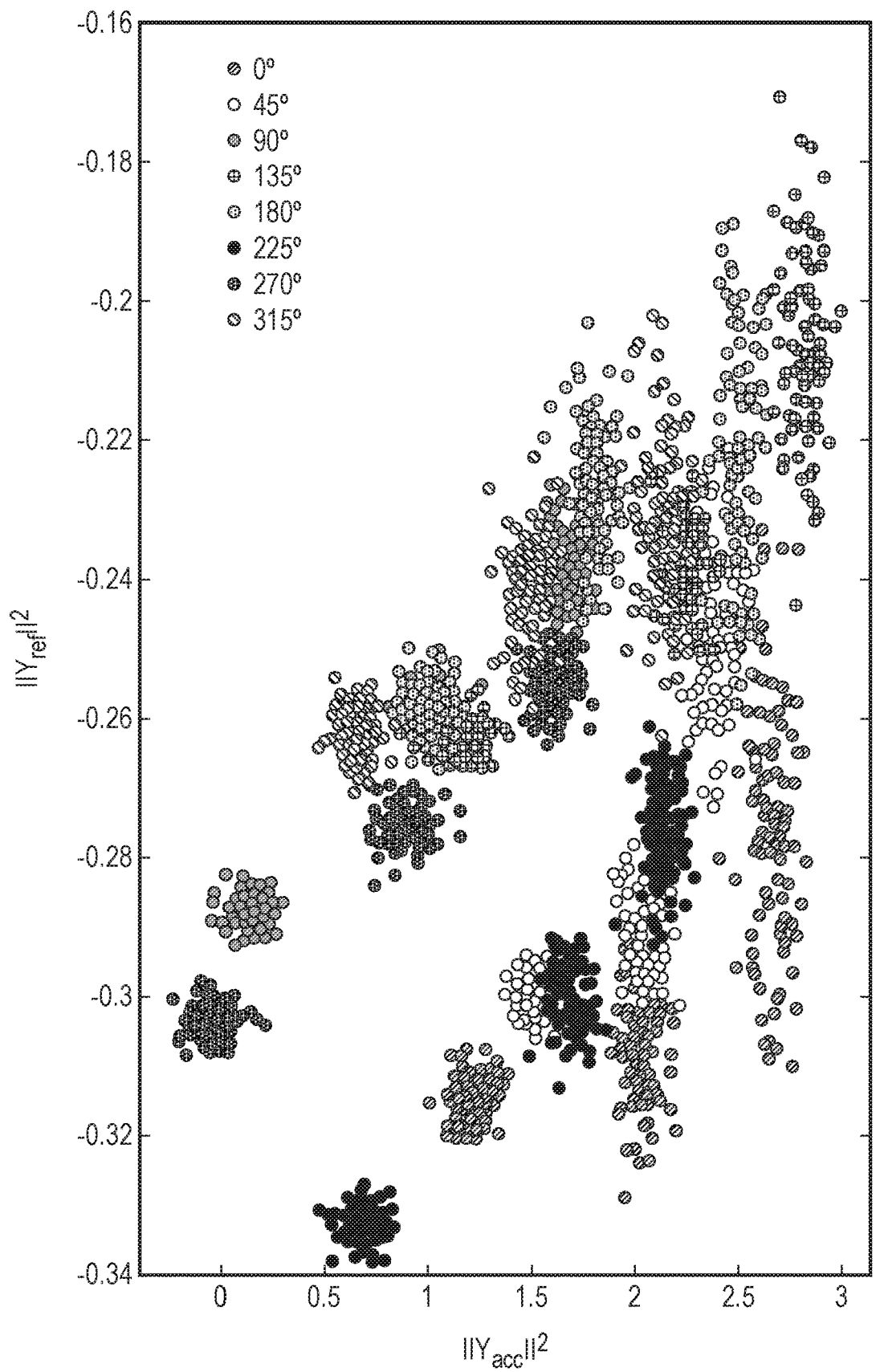
FIGS. 6a, 6b and 6c are scatter plots of accelerometer subband power vs microphone subband power for different incident wind angles and wind speeds of wind received at the apparatus shown in FIGS. 1a to 1c.
Figure 6B:
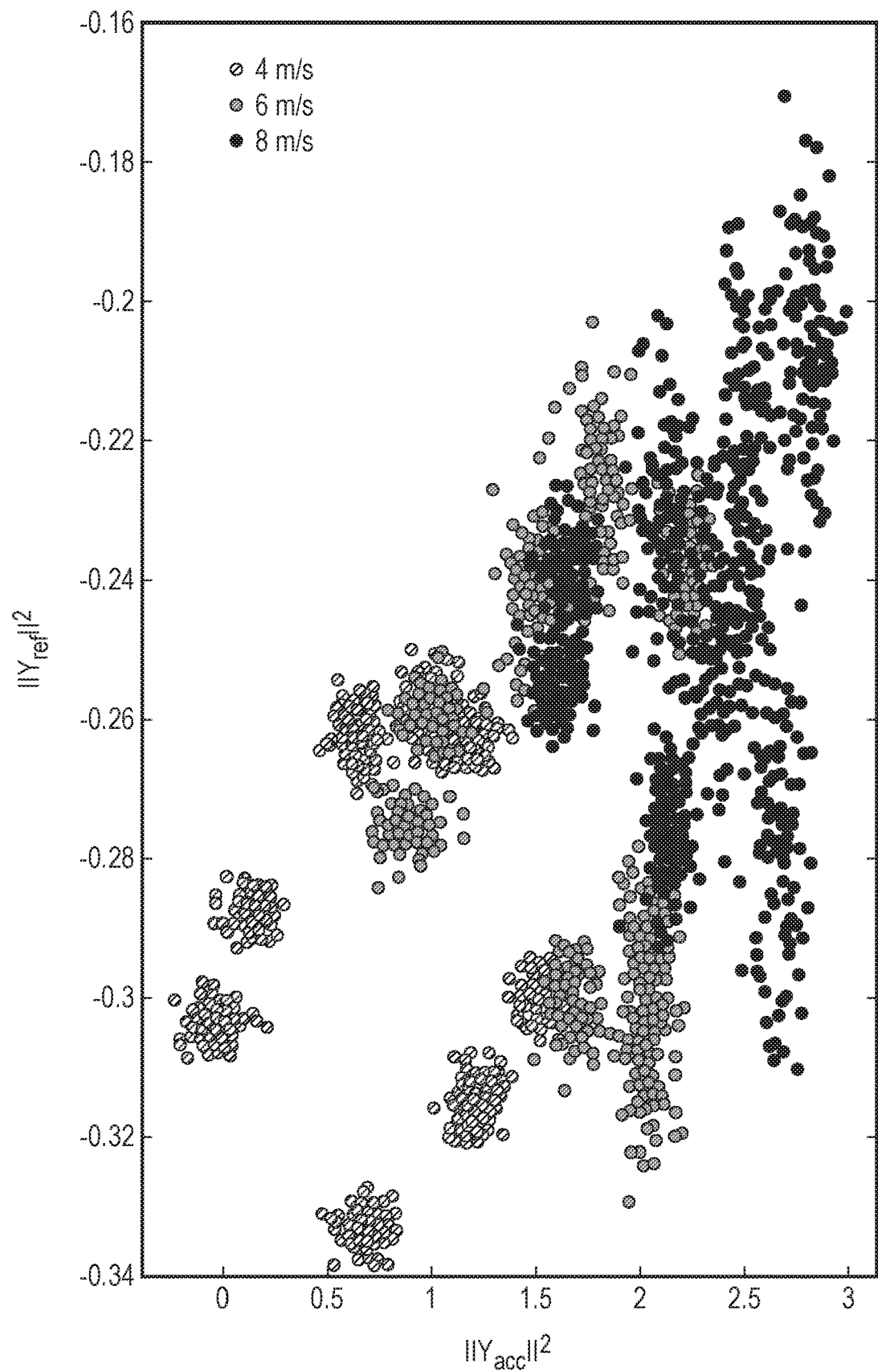
Figure 6C:
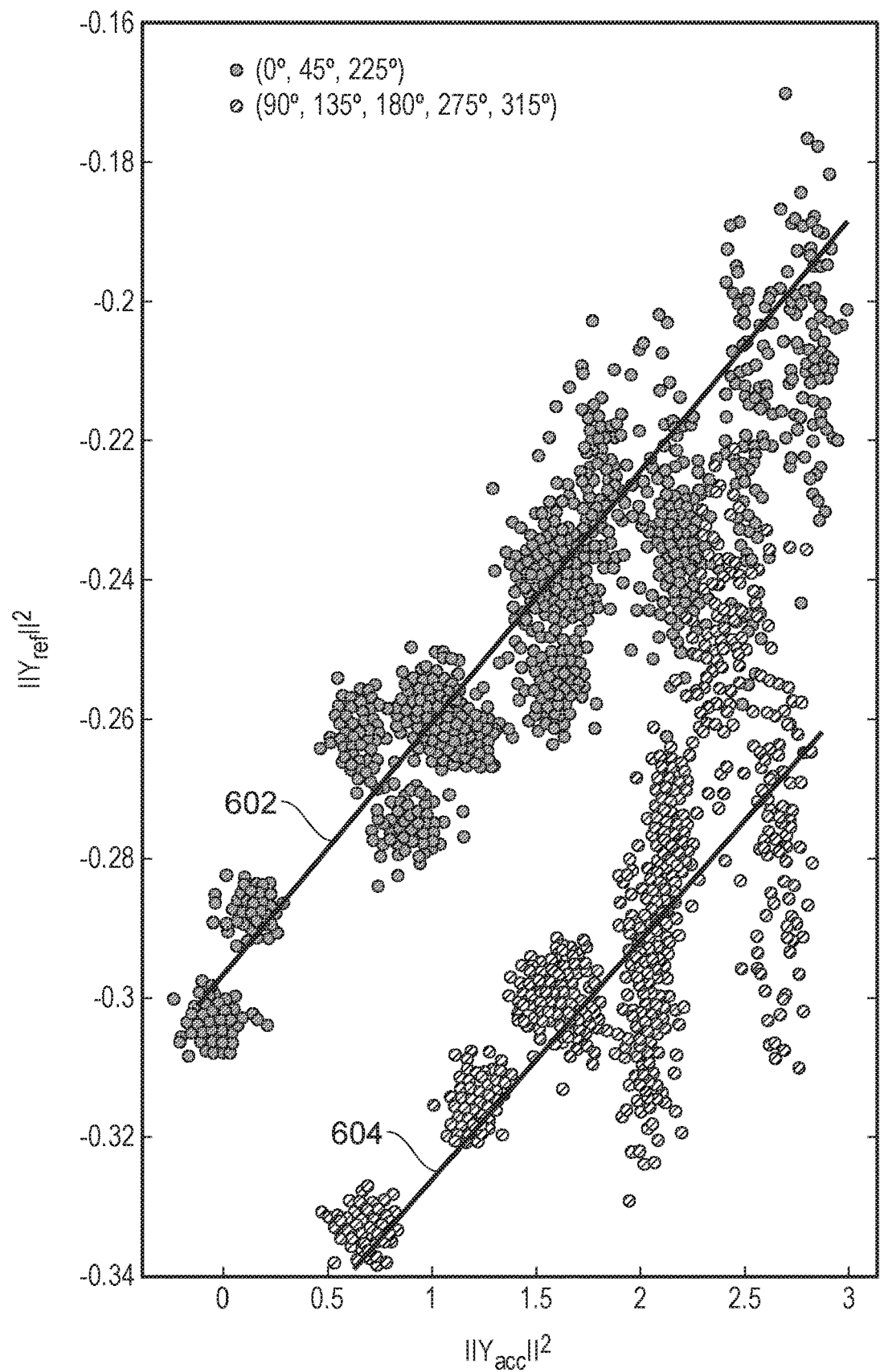

FIGS. 6a, 6b and 6c are scatter plots of accelerometer subband power (horizontal axis) vs microphone subband power (vertical axis) for different incident wind angles and wind speeds in a quiet environment. It will be appreciated that in a quiet environment (with no non-wind noise), power in the microphone signal is due to wind and will result in wind noise in the microphone signal. The same points are plotted on each of the Figures, but are grouped differently by colour/shading in each plot. FIG. 6a delineates by colour/shading between angle of incidence of wind (0°, 45°, 90°, 135°, 180°, 225°, 270°, 315°) as depicted in FIG. 1c. FIG. 6b delineates by colour/shading between wind speed (4 m/s, 6 m/s and 8 m/s). FIG. 6c groups the points into two groups based on angle of incidence, the first group including measurements made in the presence of wind at angles 0°, 45° and 225°, and the second group including measurements made in the presence of wind at angles 90°, 135°, 180°, 270° and 315°.

These Figures show that microphone subband power (due to wind) increases in variance with increasing wind speed. This is a result of the increasing turbulence around the microphone port as wind speed increases. It can also be seen that there are two angular clusters most clearly illustrated in FIG. 6c, evidenced by a difference in microphone subband power for the same measured accelerometer subband power. These two clusters correspond approximately to wind being incident from the front (forward) and rear (reverse) of the apparatus 100. Linear regression lines 602, 604 are also provided in FIG. 6c. The first regression line 602 represents subband power correlation between accelerometer and microphone signals in response to wind from angles of 0°, 45° and 225°. The second regression line 604 represents subband power correlation (below 500 Hz) between accelerometer and microphone signals in response to wind at angles 90°, 135°, 180°, 270° and 315°. For moderate wind speeds, therefore, the relationship shown in FIGS. 6a to 6c between microphone and accelerometer subband power may be used to estimate subband power due to wind noise present in an output signal from the microphone 102 based on subband power in signals output from the accelerometer 104. For example, a model or look up table or the like may be generated on the basis of the above or similar data to translate one or more subband accelerometer powers of received accelerometer signals into one or more of a wind speed, a wind direction, a microphone noise cut-off frequency.

Figure 7:
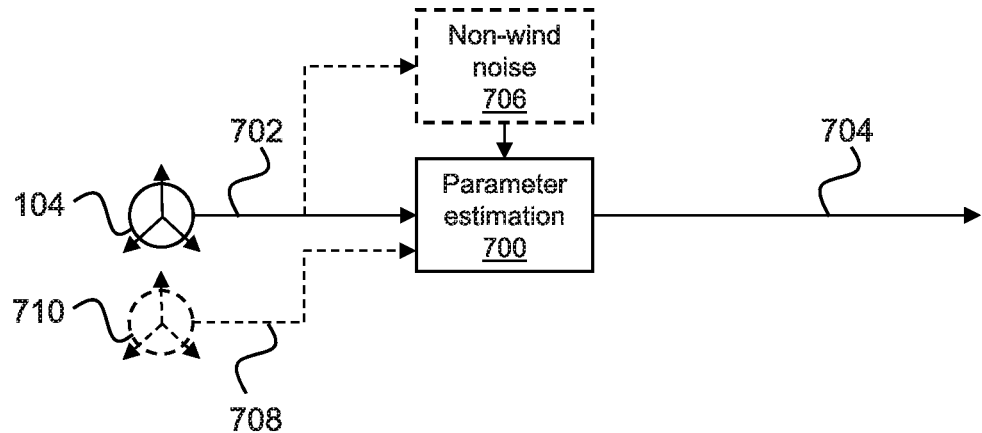
FIG. 7 is a block diagram of an exemplary parameter estimation module implemented by the apparatus shown in FIGS. 1a to 1c.

FIG. 7 is a block diagram of parameter estimation module 700 according to an embodiment of the present disclosure which may be implemented by the apparatus 100 shown in FIG. 1b. The parameter estimation module 700 is configured to receives one or more accelerometer signals 702 output from the accelerometer 104. The accelerometer signals 702 from the accelerometer 104 may first be digitised (quantised and discretised) into frames of a certain duration (number of elements, M) before being provide to the parameter estimation module 700. The accelerometer 104 may generate a signal for each of one or more axes of the accelerometer 104. For example, where the accelerometer 104 comprises 3 measurement axes, the one or more accelerometer signals 702 may comprise three signals; one for each axis of measurement. The parameter estimation module 700 is configured to generate a parameter estimation output 704 comprising one or more estimated parameters of wind incident at the accelerometer 104. Such parameters may include, but are not limited to, the presence of wind at the accelerometer 104, wind velocity, wind direction, and cut-off frequency of noise in the microphone signal.

Optionally, a non-wind noise detector 706 may be provided in addition to the parameter estimation module 700. In some embodiments, the non-wind noise detector 706 may be incorporated into the parameter estimation module 700. The non-wind noise detector 706 may be configured to detect the presence of noise at the accelerometer 104 which is not associated with wind. For example, the non-wind noise detector 706 may implement a voice activity detector (VAD) configured to detect user speech at the accelerometer 104. As mentioned previously, the presence of speech may affect the ability to accurately estimated wind parameters based on accelerometer signals. Accordingly, the non-wind noise detector 706 may output a voice activity signal to the parameter estimation module 700 indicating whether or not speech has been detected. In another example, the non-wind noise detector 706 may determine whether the user 107 is running or walking, which may cause noise at the accelerometer 104 due to violent changes in direction of the accelerometer 104 (i.e. up and down). Such noise due to running, for example, presents as a broadband signal at the accelerometer 105 above around 100 Hz. Accordingly, the non-wind noise detector 706 may output a signal indicating that non-wind noise is present and may be corrupting any wind noise component of the one or more signals output from the accelerometer 104. In response to one or more signals received from the non-wind noise detector 706, to avoid inaccurate estimation of parameters, the parameter estimation module 700 may only use accelerometer signals 702 received from the accelerometer 104 during periods where it is indicated that non-wind noise is not present or that such non-wind noise is not substantially effecting signals output from the accelerometer 104. Additionally, or alternatively, outputs from the non-wind noise detector 706 may be used to toggle one or more filters to remove components of the one or more accelerometer signals related to non-wind noise.

In addition to receiving accelerometer signals 702 from the accelerometer 104 of the apparatus 100, the parameter estimation module 700 may optionally receive additional accelerometer signals 708 from one or more additional accelerometers 710. For example, the one or more additional accelerometer 710 may be spatially separated from the accelerometer 104 of the apparatus 100. Where the apparatus 100 comprises an earphone or headphone or a set of earphones or headphones, for example, the one or more additional accelerometer 710 may comprise an accelerometer located in the other earphone or headphone of the pair. The spatial separation of the accelerometer 104 and the one or more additional accelerometers 710 may enable the parameter estimation module 700 to resolve the direction of incidence of wind. This may be achieved, for example, by comparing a common property of accelerometer signals received from each accelerometer, such as subband power.

The parameter estimation module 700 may determine one or more of the above parameters by determining various characteristics of the one or more accelerometer signals. In some embodiments, the parameter estimation module may determine the power of a subband of the one or more accelerometer signals 702.

Figure 8:
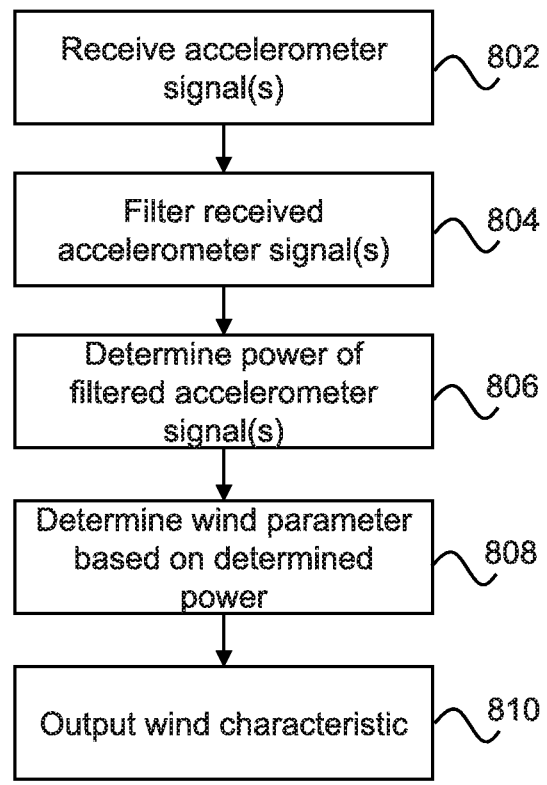
FIG. 8 is a flow diagram of a process which may be implemented by the parameter estimation module shown in FIG. 7.

FIG. 8 is a flow diagram of a process which may be implemented by the parameter estimation module 700 shown in FIG. 7. At step 802, the parameter estimation module 700 may receive one or more accelerometer signals 702, 708 from the one or more accelerometers 104, 710. The accelerometer signal(s) 702, 708 may then be filtered at step 804 to generate one or more subband accelerometer signals. Filtering may comprise low-pass filtering to remove components of the accelerometer signal above a threshold frequency. In some embodiments, the threshold frequency is determined based on the spectral power profile of the accelerometer 104. The threshold frequency may be chosen so as to remove substantially all non-wind noise present due to speech, cross-talk from the loudspeaker(s) in the apparatus 100, taps or other physical interactions with the headset and/or any idle channel noise. In some embodiments, the threshold (cut-off) frequency is around 500 Hz. In some embodiments, the threshold may differ between accelerometer signals. Additionally, filtering may also comprise high-pass filtering to remove components of the accelerometer signal(s) associated with motion of the accelerometer, for example, due to movement of the headset (walking/running etc.). The parameter estimation module 700 may then determine a subband power of each of the subband accelerometer signals at step 806. The determined subband power(s) may then be used at step 808 to estimate one or more parameters or characteristics of wind incident at the microphone. For example, the subband power may be used to determine a wind speed at the accelerometer 104. Additionally or alternatively, the subband power may be used to determine an angle of incidence of wind at the accelerometer 104. Additionally or alternatively, the subband power may be used to determine a microphone noise cut-off frequency of one or both of the microphones 102, 103 below which noise is affecting signal(s) output one or both of the microphones 102. A determination may be made based on one or more models or lookup tables stored in memory. The one or more modules or lookup tables may be generated in advance, as described above. The one or more wind parameters or characteristics may then be output at step 810 in the parameter estimation output 704.

As described above and illustrated in FIG. 6c, the relationship between microphone subband power and accelerometer subband power is dependent on the angle of incidence of the wind at the apparatus 100. Accordingly, knowledge of incident wind angle may be used to determine which of a plurality of models or lookup tables to use for parameter estimation. For example, where the parameter estimation module 700 receives accelerometer signals 702, 708 from the accelerometer 104 in addition to the one or more additional accelerometers 710, at step 808, the parameter estimation module 700 may compare the determined subband signal powers of the respective accelerometer signals and make a determination of the angle of incidence of wind relative to the apparatus 100. The parameter estimation module 700 may then determine, based on this, which of a plurality of models or lookup tables to use for the determination of wind parameters.

Figure 9:
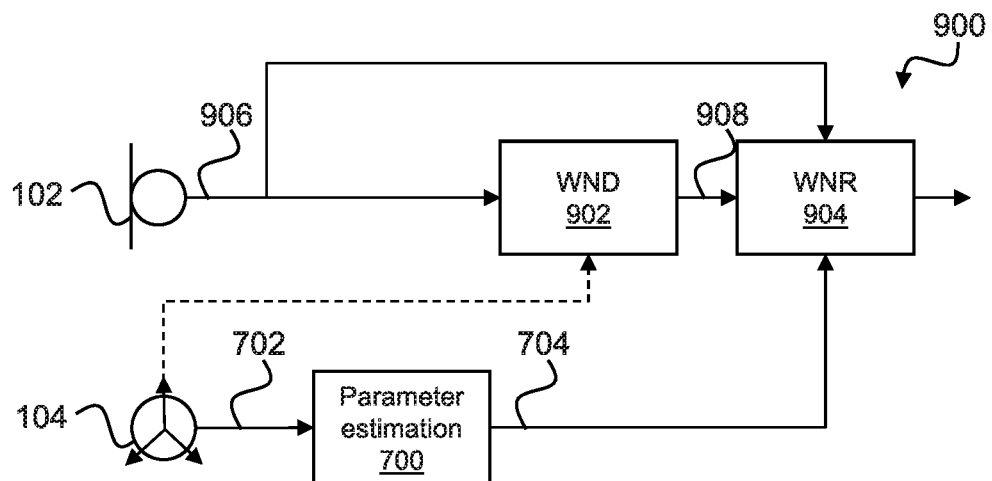
FIGS. 9, 10 and 11 are block diagrams of wind noise reduction systems which incorporate the parameter estimation module of FIG. 7.
Figure 10:
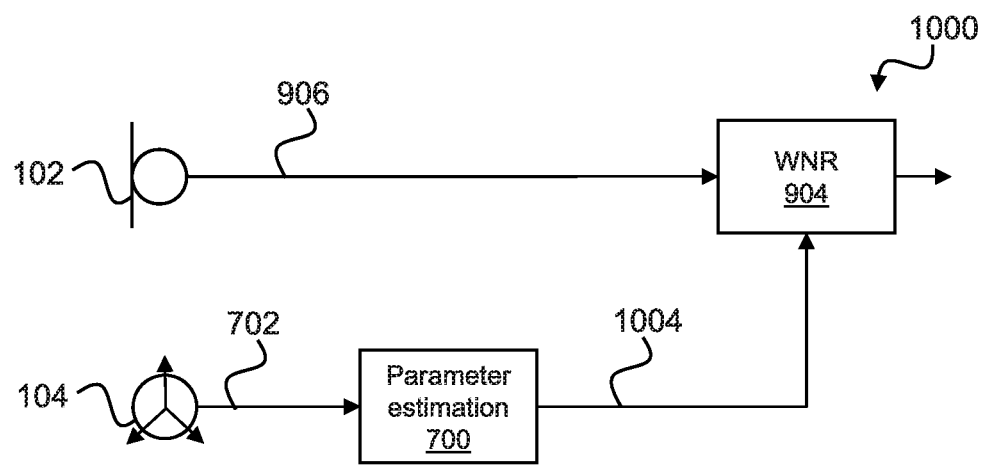
Figure 11:
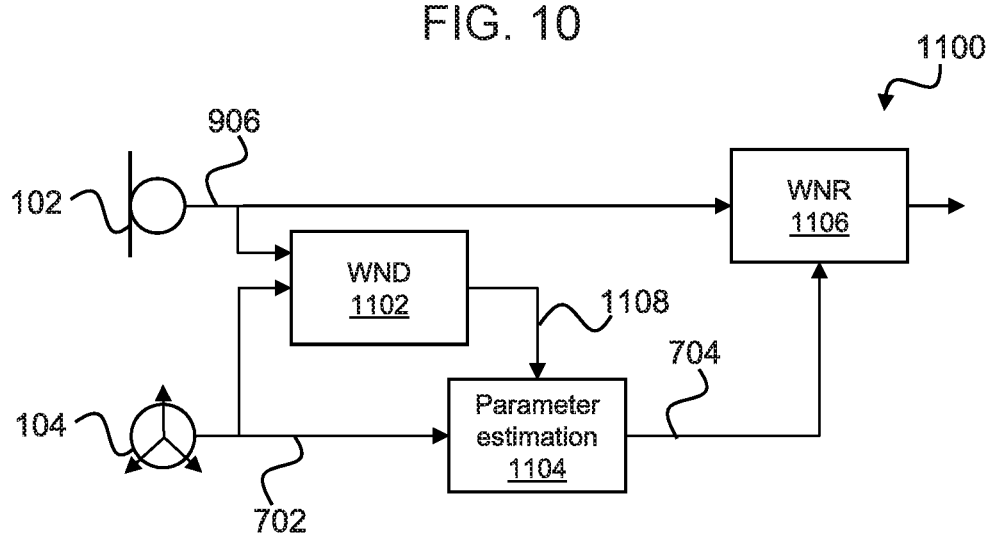

FIGS. 9, 10 and 11 are a block diagram of wind noise reduction system 900, 1000, 1100 which incorporates the parameter estimation module 700 of FIG. 7. For simplicity, the optional non-wind noise detector 706 and additional accelerometer(s) 710 shown in FIG. 7 are not shown in FIG. 9, 10 or 11, but may be incorporated into the systems 900, 1000, 1100.

Referring to FIG. 9, the system 900 comprises a wind noise detection (WND) module 902 and a wind noise reduction (WNR) module 904. The wind detection module (WND) 902 comprises an input for receiving a microphone output signal 906 from the microphone 102. The WND module 902 is configured to detect wind at the microphone 102 based on the received microphone output signal 906 and output a wind detect signal 908 to the WNR module 904. An exemplary WND module is described in U.S. Pat. No. 9,516,408, the content of which is hereby incorporated by reference in its entirety.

The WNR module 904 is configured to receive the wind detect signal 908 from the WND module 902, the parameter signal 704 from the parameter estimation module 700 and the microphone signal 906 from the microphone 102 and reduce wind noise in the microphone signal 906 when noise is detected by the WND module 902 and based on the parameter signal 700 from the parameter estimation module. For example, the WNR module 904 may determine an intensity of wind in each microphone 102, 103 and combine signals such that wind power is reduced in the resultant signal so as to minimise wind. For example, the WNR module 904 may, based on wind intensity in each subband, dynamically attenuate subbands affected by wind. For example, the WNR module 904 may implement suppression or compression using the estimated cut-off frequency to dynamically set up the bandwidth or knee point of the compression algorithm. The amount of compression could therefore be controlled based on the cut-off frequency and/or the intensity of wind. An exemplary method of wind noise reduction is described in U.S. Pat. No. 9,589,573, the content of which is hereby incorporated by reference in its entirety.

FIG. 10 is a block diagram of a wind noise reduction system 1000 which is a variation of the system 900 shown in FIG. 9 with like parts given like numerals. In the wind noise reduction system 1000, wind noise detection is performed by the parameter estimation module 700. The parameter estimation module 700 may output one or more wind parameter 1004 in addition to a flag that wind is present or likely to be present to the WNR module 904.

FIG. 11 is a block diagram of a wind noise reduction system 1100 which is a further variation of the system 900 shown in FIG. 9 with like parts given like numerals. The wind noise reduction system 1100 comprises a WND module 1102, a parameter estimation module 1104 and a WNR module 1106. In FIG. 11 the WND module 1102 may receive one or both of the microphone signal 906 and the accelerometer signal(s) 702 and make a determination of the presence of wind based on one or both of these signals 906, 702. The WND module 1102 may then output a wind detect signal 1108 to the parameter estimation module 1104. The parameter estimation module 1104 may then determine one or more parameters of wind based on the accelerometer signal(s) 702 only when wind is detected by the WND module 1102, i.e. only when the wind detect signal 1108 indicates the presence of wind to the parameter estimation module 1104. The parameter estimation module 1104 may then output one or more parameter signals 1110 to the WNR module 1106 when it is determined by the WND module 1102 that wind is present. When it is determined by the WND module 1102 that wind is not present, the parameter estimation module 1104 may output an indication as such to the WNR module 1106 or, alternatively, may output not signal to the WNR module 1106. Based on the signal(s) 704 received from the parameter estimation module 1104, the WNR module 1106 may apply wind noise reduction to the microphone signal 906. The WNR module 1106 may reduce wind noise in the microphone signal 906 in any manner known in the art, such as those described with reference to the WNR module 906 of FIG. 9 and FIG. 10.

Embodiments may be implemented in an electronic, portable and/or battery powered host device such as a smartphone, an audio player, a mobile or cellular phone, a handset. Embodiments may be implemented on one or more integrated circuits provided within such a host device. Alternatively, embodiments may be implemented in a personal audio device configurable to provide audio playback to a single person, such as a smartphone, a mobile or cellular phone, headphones, earphones, etc. Again, embodiments may be implemented on one or more integrated circuits provided within such a personal audio device. In yet further alternatives, embodiments may be implemented in a combination of a host device and a personal audio device. For example, embodiments may be implemented in one or more integrated circuits provided within the personal audio device, and one or more integrated circuits provided within the host device.

It should be understood—especially by those having ordinary skill in the art with the benefit of this disclosure—that that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments and implementations likewise, with the benefit of this disclosure, will be apparent to those having ordinary skill in the art, and such embodiments should be deemed as being encompassed herein. Further, those having ordinary skill in the art will recognize that various equivalent techniques may be applied in lieu of, or in conjunction with, the discussed embodiments, and all such equivalents should be deemed as being encompassed by the present disclosure.

The skilled person will recognise that some aspects of the above-described apparatus and methods, for example the discovery and configuration methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the disclosure will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly, the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

It should be noted that the above-mentioned embodiments illustrate rather than limit the invention, and that those skilled in the art will be able to design many alternative embodiments without departing from the scope of the appended claims or embodiments. The word "comprising" does not exclude the presence of elements or steps other than those listed in a claim or embodiment, "a" or "an" does not exclude a plurality, and a single feature or other unit may fulfil the functions of several units recited in the claims or embodiments. Any reference numerals or labels in the claims or embodiments shall not be construed so as to limit their scope.

Although the present disclosure and certain representative advantages have been described in detail, it should be understood that various changes, substitutions, and alterations can be made herein without departing from the spirit and scope of the disclosure as defined by the appended claims or embodiments. Moreover, the scope of the present disclosure is not intended to be limited to the particular embodiments of the process, machine, manufacture, compositions of matter, means, methods, or steps, presently existing or later to be developed that perform substantially the same function or achieve substantially the same result as the corresponding embodiments herein may be utilized. Accordingly, the appended claims or embodiments are intended to include within their scope such processes, machines, manufacture, compositions of matter, means, methods, or steps.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method, comprising:
receiving one or more accelerometer signals derived from an accelerometer; and
determining one or more parameters of wind at the accelerometer based on the one or more accelerometer signals;
wherein the one or more parameters of wind at the accelerometer comprises one or more of: a speed of wind at the accelerometer; an angle of incidence of wind at the accelerometer; and a probability of the presence of wind at the accelerometer.

2. The method of claim 1, wherein the one or more accelerometer signals comprises two or more accelerometer signals representing different axes of acceleration and wherein determining the angle of incidence of wind at the accelerometer comprises comparing the two or more accelerometer signals.

3. The method of claim 1, wherein the one or more parameters of wind at the accelerometer comprises an indication of the presence of wind at the accelerometer.

4. The method of claim 1, further comprising filtering one or more of the one or more accelerometer signals to remove non-wind noise and wherein the one or more parameters of wind are determined based on the filtered one or more accelerometer signals.

5. The method of claim 1, further comprising detecting the presence of non-wind noise in one or more of the one or more accelerometer signals, and wherein the determining is performed only when non-wind noise is not detected.

6. The method of claim 1, further comprising:
receiving a microphone signal from a microphone proximate to the accelerometer; and
reducing wind noise in the microphone signal based on the determined one or more parameters of wind at the accelerometer.

7. The method of claim 6, wherein determining one or more wind parameters at the accelerometer comprises:
determining a subband power in one or more of the accelerometer signals; and
estimating a cut-off frequency of noise in the microphone signal based on the determined subband power in the one or more accelerometer signals,
and wherein wind noise is reduced in the microphone signal using the estimated cut-off frequency.

8. The method of claim 7, wherein wind noise is reduced in the microphone signal using a compressor and wherein a knee point of the compressor is determined in dependence on the estimated cut-off frequency.

9. The method of claim 8, wherein determining one or more wind parameters at the accelerometer further comprises determining wind speed, and wherein the knee point of the compressor is further determined in dependence on the determined wind speed.

10. The method of claim 7, wherein estimating the cut-off frequency comprises translating the subband power into the cut-off frequency using a look up table.

11. The method of claim 6, further comprising:
detecting the presence of wind at the microphone or determining a probability of wind at the microphone based on the microphone signal.

12. The method of claim 11, wherein the step of determining one or more parameters of wind at the accelerometer is performed in response to detecting the presence of wind at the microphone.

13. An apparatus, comprising:
memory; and
a processor coupled to the memory and configured to:
receive one or more accelerometer signals derived from an accelerometer; and
determine one or more parameters of wind at the accelerometer based on the one or more accelerometer signals;
wherein the one or more parameters of wind at the accelerometer comprises one or more of: a speed of wind at the accelerometer; an angle of incidence of wind at the accelerometer; and a probability of the presence of wind at the accelerometer.

14. The apparatus of claim 13, wherein the one or more parameters of wind at the accelerometer comprises a speed of wind at the accelerometer and/or an angle of incidence of wind at the accelerometer.

15. The apparatus of claim 14, wherein the one or more accelerometer signals comprises two or more accelerometer signals representing different axes of acceleration and wherein determining the angle of incidence of wind at the accelerometer comprises comparing the two or more accelerometer signals.

16. The apparatus of claim 13, wherein the one or more parameters of wind at the accelerometer comprises an indication of the presence of wind at the accelerometer and/or a probability of the presence of wind at the accelerometer.

17. The apparatus of claim 13, wherein the processor is further configured to:
receive a microphone signal derived from a microphone proximate to the accelerometer; and
reduce wind noise in the microphone signal based on the determined one or more parameters of wind at the accelerometer.

18. The apparatus of claim 13, further comprising the accelerometer.

19. A method of reducing wind noise in a microphone signal received from a microphone, the method comprising:
receiving one or more accelerometer signals from one or more accelerometers in proximity to the microphone;
determining a subband power in one or more of the one or more accelerometer signals;
estimating a cut-off frequency of noise in the microphone signal based on the determined subband power; and
reducing wind noise in the microphone signal using the estimated cut-off frequency.

* * * * *

UNITED STATES PATENT AND TRADEMARK OFFICE
CERTIFICATE OF CORRECTION

PATENT NO. : 10,917,716 B2
APPLICATION NO. : 16/445538
DATED : February 9, 2021
INVENTOR(S) : Sapozhnykov et al.

It is certified that error appears in the above-identified patent and that said Letters Patent is hereby corrected as shown below:

In the Specification

1. In Column 1, Line 16, delete "port of" and insert -- port --, therefor.

2. In Column 6, Line 53, delete "1 b," and insert -- 1b, --, therefor.

3. In Column 7, Line 13, delete "in in" and insert -- in --, therefor.

4. In Column 7, Line 15, delete "in in" and insert -- in --, therefor.

5. In Column 8, Line 53, delete "determined" and insert -- determine --, therefor.

6. In Column 9, Line 21, delete "Figures" and insert -- figures --, therefor.

7. In Column 10, Line 15, delete "receives" and insert -- receive --, therefor.

8. In Column 10, Line 19, delete "provide" and insert -- provided --, therefor.

9. In Column 12, Line 16, delete "system" and insert -- systems --, therefor.

10. In Column 12, Lines 24-25, delete "wind detection module (WND) 902" and insert -- wind noise detection (WND) module 902 --, therefor.

11. In Column 12, Line 39, delete "signal 700" and insert -- signal 704 --, therefor.

12. In Column 13, Line 25, delete "WNR module 906" and insert -- WNR module 904 --, therefor.

13. In Column 13, Line 45, delete "that that" and insert -- that --, therefor.

14. In Column 14, Line 12, delete "applications" and insert -- application --, therefor.

Signed and Sealed this
Ninth Day of May, 2023

*Katherine Kelly Vidal*

Katherine Kelly Vidal
*Director of the United States Patent and Trademark Office*